UNITED STATES PATENT OFFICE.

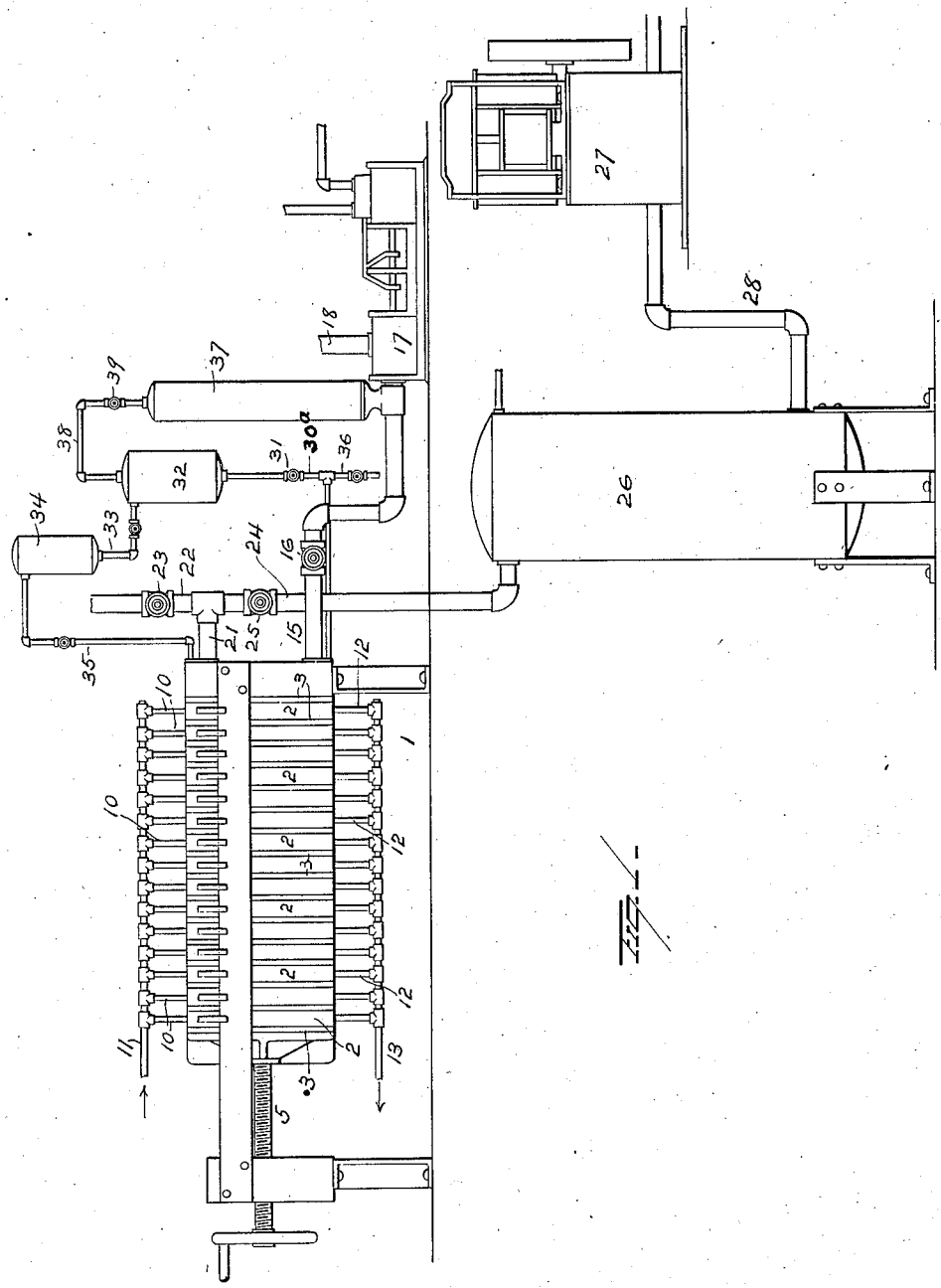

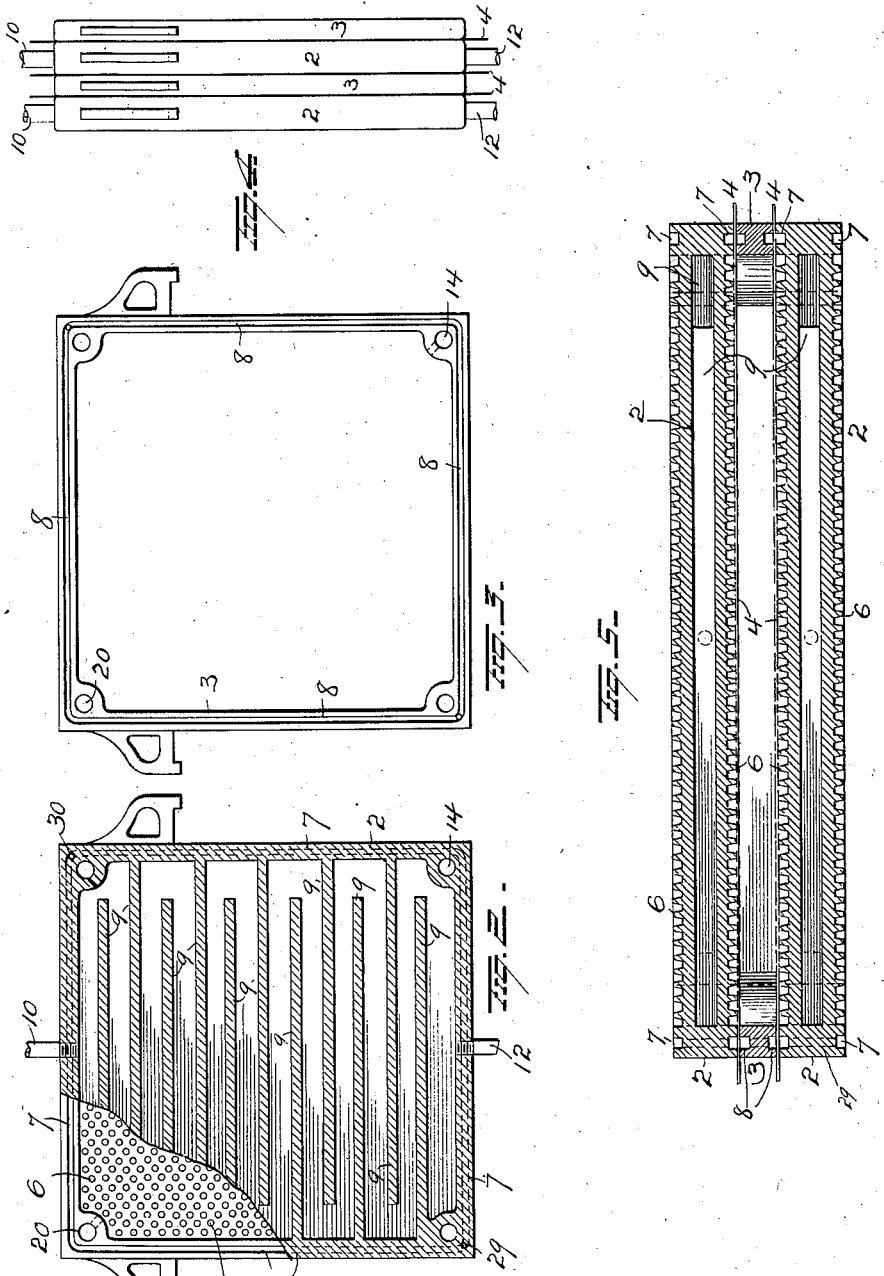

MATTHEW S. HOPKINS, OF ROLAND PARK, AND CHARLES R. BARNETT, OF BALTIMORE, MARYLAND, ASSIGNORS TO SEPARATE RECOVERY COMPANY, OF ALEXANDRIA, VIRGINIA, A CORPORATION OF VIRGINIA.

APPARATUS FOR DRYING AND RECOVERING VALUABLE PRECIPITATES.

1,049,715.  Specification of Letters Patent.  Patented Jan. 7, 1913.

Application filed April 22, 1909. Serial No. 491,649.

*To all whom it may concern:*

Be it known that we, MATTHEW S. HOPKINS and CHARLES R. BARNETT, of Roland Park and Baltimore, respectively, in the State of Maryland, have invented certain new and useful Improvements in Apparatus for Drying and Recovering Valuable Precipitates; and we do hereby declare the following to be a full, clear, and exact description of the invention, such as will enable others skilled in the art to which it appertains to make and use the same.

This invention relates to improvements in apparatus for recovering and drying valuable precipitates, one object of the invention being to avoid the use and expense of a separate drying room for a precipitate which has been filtered from a liquid.

A further object is to provide means for separating fluid from solid and drying the precipitated solids in the same apparatus.

A further object is to provide apparatus whereby solids can be filtered from liquid and subsequently dried and recovered from the filter and whereby the liquid can be recovered for future use.

With these objects in view the invention consists in certain novel features of construction and combinations of parts as hereinafter set forth and pointed out in the claims.

In the accompanying drawings, Figure 1 is a view of a plant embodying our improvements, Fig. 2 is a longitudinal sectional view, partly in elevation, of one of the filter plates; Fig. 3 is a view in elevation of one of the spacing frames; Fig. 4 is an edge view of two filter plates and two spacing frames, and Fig. 5 is a transverse sectional view through two filter plates and a spacing frame.

1 represents a filter press which may comprise a series of hollow plates 2 and spacing frames 3, held together with filter cloths 4 between them, by means of a suitable clamp 5. The spaces afforded by the frames 3 between each pair of filter plates constitute receptacles for the solid matter or precipitate to be removed from the liquid. Each filter plate is provided on its exterior faces with numerous projections 6 which may be pyramidal in form and against these projections the filter cloths 4 rest. The filter cloths are held in place by being clamped between the filter plates and the adjacent frames 3 and in order that the liquid passing through the filter press shall not be wasted on account of capillary attraction afforded by the edges of the cloths which project between the filter plates and frames, we provide a liquid seal between the plates and frames and the liquid for this seal will be such as will not be miscible with the liquid being filtered and hence will not permit the latter to escape by capillary attraction from the edges of the filter cloths. To provide for the said liquid seal, the adjacent faces of the filter plates and frames are provided with grooves 7—8 respectively in proximity to the several edges. The liquid for the seal will be maintained under the same pressure as that of the liquid in the filter press, in a manner which will be hereinafter explained. Each filter plate 2 is provided interiorly with a staggered series of baffles 9 to cause a circulation through all parts of the plate, of steam or other heating medium which enters the respective plates by means of pipes 10 connected with a pipe 11 which receives the heating medium from any suitable source of supply. The opposite edge of each filter plate is provided with an outlet and with these outlets pipes 12 communicate and convey the exhausted heating medium to a pipe 13 from which it will be discharged at any suitable place.

The spaces for precipitate, formed by the frames 3, communicate with ducts 14 extending through corner portions of the filter plates and frames and with this duct a pipe 15 communicates. The pipe 15 is provided with a valve 16 and at its other end communicates with a pump 17, the latter being provided with an inlet pipe 18 for the liquid to be filtered. A duct 20 is formed by alining openings in the filter plates and frames for the outlet of the filtrate. A pipe 21 communicates with this duct and with the pipe 21 a discharge pipe 22 (having a valve 23) communicates for carrying off the filtrate when the same is not valuable. It frequently happens however that the filtrate will be a valuable product and should be saved and in some instances this filtrate is a volatile liquid and could not be completely withdrawn from the filter press through the pipe 22. In any case the precipitate within the filter press will contain more or less of the filtrate and in order that the said precipitate shall be thoroughly dried within the filter press and thus avoid the necessity for removing the same to a room specially equipped for drying it, all of the moisture caused by the filtrate which may remain in the precipitate after the bulk of the filtrate has been drawn off through the pipe 22, must be removed. We therefore connect with the pipe 21, a pipe 24 having a valve 25, and at its other end, the pipe 24 communicates with a condenser 26 of any preferred form of construction. With the condenser 26, a vacuum pump 27 is connected through the medium of a pipe 28.

The liquid to be filtered is forced through the filter press by the action of the pump 17, as before explained, and the filtrate permitted to escape through the pipes 21—22, the valve 23 being open and the valve 25 closed. When the filter press shall have become filled with precipitate, the valve 23 will be closed and the valve 25 opened. Steam or other heating medium will now be caused to pass through the filter plates for the purpose of volatilizing or vaporizing any liquid which may be contained in the precipitate and at the same time, the vacuum pump will be operated to withdraw this volatilized or vaporized liquid and cause the same, in its passage through the condenser 26 to be condensed. The filter press will thus be subjected to heat and vacuum until the precipitate shall have been thoroughly dried when it can be removed from the filter press as a finished product. The apparatus will thus operate to separate solids from liquid; thoroughly dry the solids and permit the recovery of the liquid filtrate.

Our improvements are valuable for the separation of any solid from liquid with which it may be mixed when it is desirable to recover such solids in a dry and marketable condition.

One important application of the invention may be found in the separation of pigment from a liquor of a volatile nature, such as benzin. In such case the pigment can be recovered from the filter press in a dry and marketable condition and the volatile liquid can also be recovered for future use.

As before intimated, more or less of the filtrate may escape from filter presses as heretofore constructed, by capillary attraction through the edges of the filter cloths and this is especially true of volatile liquids. To prevent such leakage we have provided the liquid seals between the filter plates and frames and the grooves in which these liquid seals are formed communicate with ducts 29 and 30 in diagonally opposite corners of the filter plates and frames. The duct 29 is connected by a pipe 30ª (having a valve 31) with a storage tank 32 for sealing liquid. The upper end of this tank is connected by means of a valved pipe 33 with a smaller tank 34 and the latter is connected by means of a valved pipe 35 with the duct 30. The pipe 30ª may be provided with a valved discharge pipe 36. When the filter press has been assembled, liquid from the tank 32 will be caused to flow into the grooves 7—8 of the filter plates and frames to form the liquid seals and this liquid being such as will not be miscible with the liquid being filtered, it will moisten the filter cloths and prevent the passage of the liquid being filtered. It is important as hereinbefore intimated, that a pressure shall be maintained on the liquid constituting the seals which shall be equal to the pressure of the liquid being filtered within the filter press. We therefore provide an air chamber 37 which is connected with the pipe 15 in close proximity to the pump 17 or connected directly to said pump if desired, and the upper end of this air chamber is connected by means of a pipe 38 (having a valve 39) with the upper end of the storage tank 32. It is apparent that the pressure in the storage tank 32 and therefore on the liquid seal will be exactly the same as the pressure on the liquid forced into the filter press by the pump 17. With such construction and operation, if any liquid would find its way by capillary attraction to the projecting edges of the filter cloths, it would be the seal liquid and not the liquid being filtered.

Various slight changes might be made in the details of construction of our apparatus without departing from the spirit of our invention or limiting the scope thereof and hence we do not wish to restrict ourselves to the precise mechanical details herein set forth.

Having fully described our invention what we claim as new and desire to secure by Letters Patent, is,—

1. A combined filtering and drying apparatus, comprising a plurality of hollow filter plates, frames alternating with said plates, filter cloths between the filter plates and frame, means for passing a heated medium through the hollow filter plates, and a vacuum pump connected with the precipitate chambers between the plates and frames for drying the precipitate in said chambers.

2. A combined filtering and drying apparatus, comprising a filter press, means for heating the same, a vacuum pump, a condenser connected with the vacuum pump and a connection between said condenser and precipitate chambers of the filter press for effecting the drying of precipitate in said chambers.

In testimony whereof, we have signed this specification in the presence of two subscribing witnesses.

MATTHEW S. HOPKINS.
CHARLES R. BARNETT.

Witnesses:
FELIX R. SULLIVAN,
F. HERBERT PREM.